a2US008556521B2

(12) United States Patent
Everett et al.

(10) Patent No.: US 8,556,521 B2
(45) Date of Patent: Oct. 15, 2013

(54) EXPANDED BEAM OPTICAL FIBRE CONNECTOR

(75) Inventors: David Edward Everett, Sudbury (GB); Mark Edward Hicks, Chelmsford (GB)

(73) Assignee: Fibreco Limited (GB)

( * ) Notice: Subject to any disclaimer, the term of this patent is extended or adjusted under 35 U.S.C. 154(b) by 362 days.

(21) Appl. No.: 12/825,787

(22) Filed: Jun. 29, 2010

(65) Prior Publication Data

US 2010/0329612 A1    Dec. 30, 2010

(30) Foreign Application Priority Data

Jun. 30, 2009 (GB) .................................. 0911359.8

(51) Int. Cl.
G02B 6/36 (2006.01)
(52) U.S. Cl.
USPC ............................................. 385/62; 385/87
(58) Field of Classification Search
USPC ....................................................... 385/62
See application file for complete search history.

(56) References Cited

U.S. PATENT DOCUMENTS

| | | | |
|---|---|---|---|
| 4,015,897 | A | 4/1977 | Konoma et al. |
| 4,082,421 | A | 4/1978 | Auracher et al. |
| 4,096,315 | A | 6/1978 | Kubacki |

(Continued)

FOREIGN PATENT DOCUMENTS

| | | |
|---|---|---|
| EP | 1376173 | 1/2004 |
| EP | 1 417 520 | 7/2007 |

(Continued)

OTHER PUBLICATIONS

Development of a Ruggedized, High Performance, Field TeEW vol. 839 Components for Fiber Optic Applications II (1987), pp. 104-114.

(Continued)

*Primary Examiner* — Eric Wong
(74) *Attorney, Agent, or Firm* — Leydig, Voit & Mayer, Ltd.

(57) ABSTRACT

The present invention relates to an optical connector for use in a fiber optic communications system, and particularly an expanded beam optical connector (20) for connecting optical fibers. The connector (20) comprises a housing (6), a port (48) within the housing for receiving an end (35) of an optical fiber (38), a cylindrical ferrule (32) within the housing (6) having opposite first and second ends (33, 35), and an optical fiber stub held axially (14) within the ferrule (32) and extending between said ferrule ends (33, 35). The connector (20) also has a lens (8) for projecting and/or receiving an expanded beam (40) optically coupled with the optical fiber stub at the first ferrule end (33). A sleeve (34) surrounds the ferrule (32) and extends towards the port (48) axially away from the second ferrule end (35) to present an open end to the sleeve for receiving a termination ferrule (36) of an optical fiber (38) inserted into the port. The connector (20) has a connector portion (2, 4, 5) for connecting the optical fiber connector (20) to another expanded beam optical fiber connector so that said expanded beam (40) traverses between the connectors. A channel (28) extends through the housing (6) from the port (48) towards the lens (8), the ferrule (32) being secured by means of a ring (80) within the channel (28), the ring having an outer surface (78) that makes an interference fit with an inner surface (25) of the channel and an inner surface (76) that makes an interference fit with an outer surface (74) of the ferrule towards the first ferrule end. (33).

23 Claims, 2 Drawing Sheets

(56) References Cited

U.S. PATENT DOCUMENTS

| | | |
|---|---|---|
| 4,183,615 A | 1/1980 | Rush |
| 4,183,618 A | 1/1980 | Rush et al. |
| 4,304,461 A | 12/1981 | Stewart et al. |
| 4,406,515 A | 9/1983 | Roberts |
| 4,516,829 A | 5/1985 | Borsuk et al. |
| 4,531,810 A | 7/1985 | Carlsen |
| 4,597,631 A | 7/1986 | Flores |
| 4,597,632 A | 7/1986 | Mallinson |
| 4,611,887 A | 9/1986 | Glover et al. |
| 4,632,505 A | 12/1986 | Allsworth |
| 4,687,291 A | 8/1987 | Stape et al. |
| 4,690,487 A | 9/1987 | Hale et al. |
| 4,735,480 A | 4/1988 | Levinson et al. |
| 4,765,729 A | 8/1988 | Taniguchi |
| 4,781,431 A | 11/1988 | Wesson et al. |
| 4,799,759 A | 1/1989 | Balyasny |
| 4,826,277 A | 5/1989 | Weber et al. |
| 4,836,637 A | 6/1989 | Poorman et al. |
| 4,846,544 A | 7/1989 | Bortolin et al. |
| 4,889,399 A | 12/1989 | Mariani et al. |
| 4,895,425 A | 1/1990 | Iwano et al. |
| 4,906,197 A | 3/1990 | Noll |
| 4,907,853 A | 3/1990 | Hiratsuka |
| 4,913,514 A | 4/1990 | Then |
| 4,953,938 A | 9/1990 | Buhrer et al. |
| 5,076,656 A | 12/1991 | Briggs et al. |
| 5,125,056 A | 6/1992 | Hughes et al. |
| 5,157,749 A | 10/1992 | Briggs et al. |
| 5,166,995 A | 11/1992 | Briggs et al. |
| 5,216,732 A | 6/1993 | Knott |
| 5,216,734 A | 6/1993 | Grinderslev |
| 5,241,612 A | 8/1993 | Iwama |
| 5,241,613 A | 8/1993 | Li et al. |
| 5,257,332 A | 10/1993 | Pimpinella |
| 5,259,052 A | 11/1993 | Briggs et al. |
| 5,265,182 A | 11/1993 | Hartley |
| 5,276,538 A | 1/1994 | Monji et al. |
| 5,363,461 A | 11/1994 | Bergmann |
| 5,366,315 A | 11/1994 | Hartley |
| 5,386,486 A | 1/1995 | Fan et al. |
| 5,396,572 A | 3/1995 | Bradley et al. |
| 5,418,876 A | 5/1995 | Lee |
| 5,422,970 A | 6/1995 | Miller et al. |
| 5,425,039 A | 6/1995 | Hsu et al. |
| 5,430,819 A | 7/1995 | Sizer, II et al. |
| 5,452,390 A | 9/1995 | Bechtel et al. |
| 5,459,805 A | 10/1995 | Foster |
| 5,515,469 A | 5/1996 | Zarem et al. |
| 5,521,996 A | 5/1996 | Ames et al. |
| 5,533,157 A | 7/1996 | Coutts |
| 5,539,971 A | 7/1996 | Kelly |
| 5,555,332 A | 9/1996 | Dean et al. |
| 5,590,229 A | 12/1996 | Goldman et al. |
| 5,608,828 A | 3/1997 | Coutts et al. |
| 5,642,450 A | 6/1997 | Oda |
| 5,694,240 A | 12/1997 | Sternbergh |
| 5,760,885 A | 6/1998 | Yokoyama et al. |
| 5,778,121 A | 7/1998 | Hyzin |
| 5,778,124 A | 7/1998 | Nedstedt |
| 5,898,807 A | 4/1999 | Welsh |
| 5,971,627 A | 10/1999 | Nedstedt |
| 6,019,519 A | 2/2000 | Grinderslav et al. |
| 6,035,664 A | 3/2000 | Hashizume |
| 6,040,934 A | 3/2000 | Ogusu et al. |
| 6,071,016 A | 6/2000 | Ichino et al. |
| 6,126,325 A | 10/2000 | Yamane et al. |
| 6,152,608 A | 11/2000 | Gharra et al. |
| 6,155,146 A | 12/2000 | Andrews et al. |
| 6,173,097 B1 | 1/2001 | Throckmorton et al. |
| 6,179,483 B1 | 1/2001 | Kanazawa |
| 6,305,849 B1 | 10/2001 | Roehrs et al. |
| 6,357,929 B1 | 3/2002 | Roehrs et al. |
| 6,371,660 B1 | 4/2002 | Roehrs et al. |
| 6,379,054 B2 | 4/2002 | Throckmorton et al. |
| 6,394,661 B1 | 5/2002 | Cull et al. |
| 6,540,412 B2 | 4/2003 | Yonemura et al. |
| 6,600,855 B2 | 7/2003 | Werkheiser et al. |
| 6,625,376 B2 | 9/2003 | Werkheiser et al. |
| 6,736,547 B2 | 5/2004 | Stevens et al. |
| 6,799,901 B2 | 10/2004 | Yoshimura et al. |
| 6,848,834 B1 | 2/2005 | Roehrs et al. |
| 6,865,333 B2 | 3/2005 | Porter et al. |
| 6,893,165 B2 * | 5/2005 | Ngo ........................ 385/87 |
| 6,963,678 B2 | 11/2005 | Werkheiser et al. |
| 7,006,728 B1 | 2/2006 | Jiang et al. |
| 7,031,567 B2 | 4/2006 | Grinderslav et al. |
| 7,048,449 B2 | 5/2006 | Fröjdh et al. |
| 7,063,466 B2 | 6/2006 | Ferguson |
| 7,090,409 B2 | 8/2006 | Nakajima et al. |
| 7,104,702 B2 | 9/2006 | Barnes et al. |
| 7,204,644 B2 | 4/2007 | Barnes et al. |
| 7,377,700 B2 | 5/2008 | Manning et al. |
| 7,441,962 B2 | 10/2008 | Penumatcha et al. |
| 7,455,460 B2 | 11/2008 | Pimpinella et al. |
| 7,460,750 B2 | 12/2008 | Durrant et al. |
| 7,474,822 B2 | 1/2009 | Kobayashi et al. |
| 7,476,035 B2 | 1/2009 | Cull et al. |
| 7,520,677 B2 | 4/2009 | Barnes et al. |
| 7,559,701 B2 | 7/2009 | Knobloch et al. |
| 7,563,034 B2 | 7/2009 | Chen et al. |
| 7,585,116 B2 | 9/2009 | Cull et al. |
| 7,674,047 B2 | 3/2010 | Chen et al. |
| 7,695,199 B2 | 4/2010 | Teo et al. |
| 7,712,972 B2 | 5/2010 | Mitamura |
| 7,722,261 B2 | 5/2010 | Kadar-Kallen et al. |
| 7,775,725 B2 | 8/2010 | Grinderslev |
| 7,785,017 B2 | 8/2010 | Barnes et al. |
| 7,878,716 B2 | 2/2011 | Morgenstern |
| 7,891,884 B2 | 2/2011 | Sumi et al. |
| 7,942,587 B2 | 5/2011 | Barnes et al. |
| 7,986,861 B2 | 7/2011 | Shimotsu |
| 8,047,727 B1 | 11/2011 | Barnes et al. |
| 8,085,472 B2 | 12/2011 | Kadar-Kallen |
| 8,123,417 B2 | 2/2012 | Wertman et al. |
| 2001/0002220 A1 | 5/2001 | Throckmorton et al. |
| 2002/0097964 A1 | 7/2002 | Roehrs et al. |
| 2004/0017982 A1 | 1/2004 | Nakajima et al. |
| 2004/0258364 A1 | 12/2004 | Frojdh et al. |
| 2005/0238292 A1 | 10/2005 | Barnes et al. |
| 2006/0147157 A1 | 7/2006 | Manning et al. |
| 2007/0211999 A1 | 9/2007 | Kobayashi et al. |
| 2008/0080812 A1 | 4/2008 | Kobayashi et al. |
| 2008/0107381 A1 | 5/2008 | Nishioka et al. |
| 2008/0219624 A1 | 9/2008 | Pimpinella et al. |
| 2008/0279509 A1 | 11/2008 | Durrant et al. |
| 2009/0324175 A1 * | 12/2009 | Everett et al. .............. 385/72 |
| 2010/0027943 A1 | 2/2010 | Armani et al. |
| 2010/0166372 A1 | 7/2010 | Durrant et al. |
| 2010/0189395 A1 | 7/2010 | Kadar-Kallen et al. |
| 2010/0329609 A1 | 12/2010 | Shimotsu |
| 2010/0331626 A1 | 12/2010 | Shimotsu |
| 2011/0116745 A1 | 5/2011 | Nishioka et al. |

FOREIGN PATENT DOCUMENTS

| | | |
|---|---|---|
| FR | 2 551 225 | 3/1985 |
| GB | 2111243 A | 6/1983 |
| GB | 2 145 534 | 3/1985 |
| JP | 61217008 A | 9/1986 |
| WO | WO 98/34146 | 8/1998 |
| WO | WO 01/43245 | 6/2001 |
| WO | 02/068998 A2 | 9/2002 |
| WO | 2007/119036 A1 | 10/2007 |

OTHER PUBLICATIONS

Development of a Ruggedized, High Performance, Field Terminable, Expanded Beam Connector, R. Durrant, A. Harding, ICI Stratos Group, SPIE's O-E/Fibers '87 Symposium on Fibre Optics and Integrated Optoelectronics, San Diego, Aug. 1987.

* cited by examiner

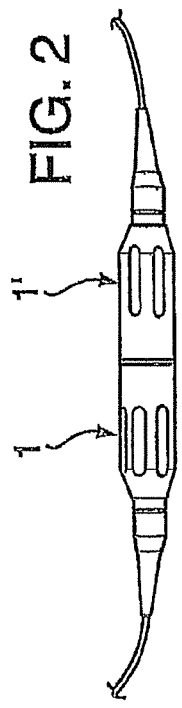
FIG. 2
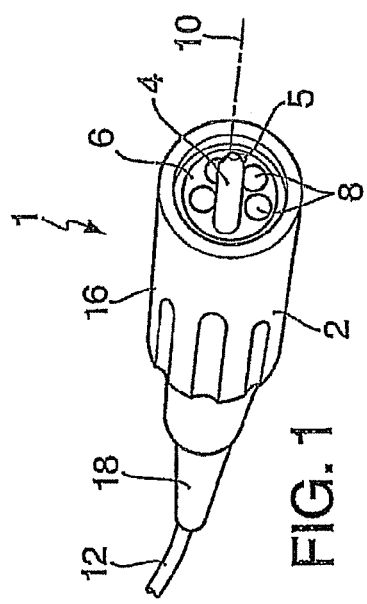
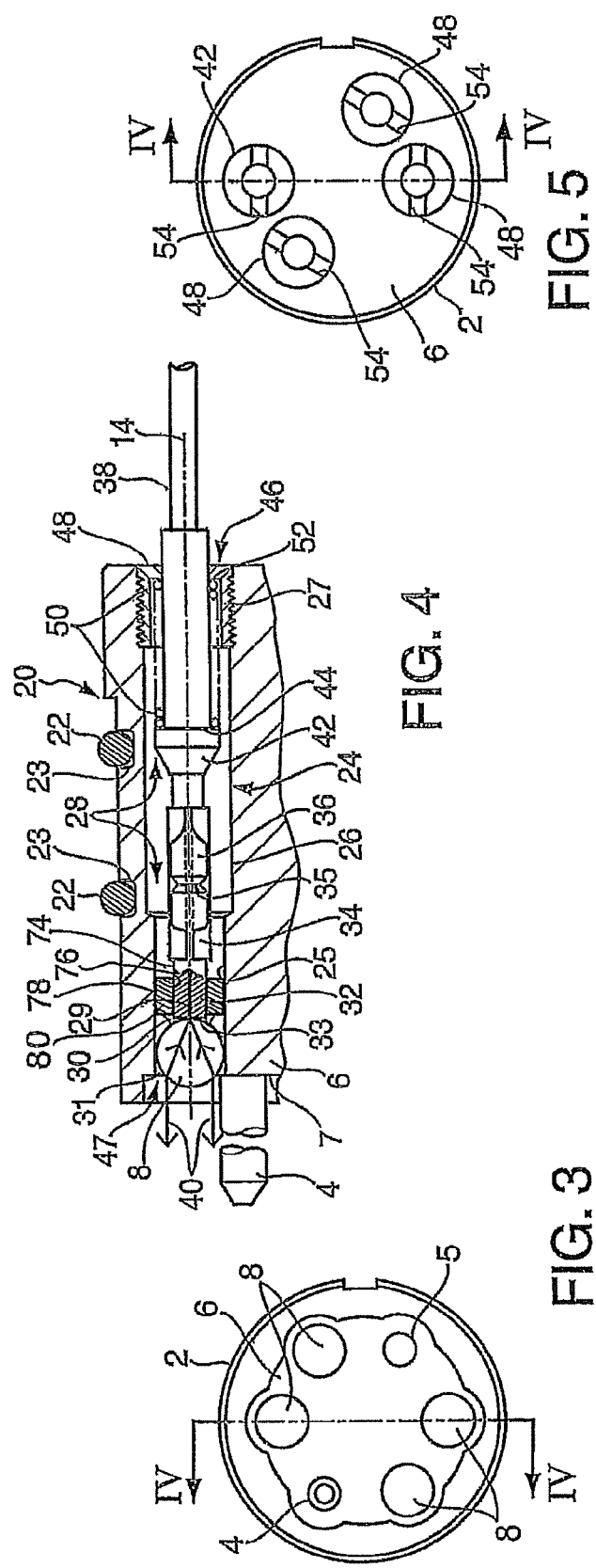

EXPANDED BEAM OPTICAL FIBRE CONNECTOR

BACKGROUND a. Field of the Invention

The present invention relates to an optical connector for use in a fibre optic communications system, and particularly an expanded beam optical connector for connecting optical fibres.

b. Related Art

An optical fibre communications system may need to be used in a harsh environment where the connector may be subject to impacts, dirt or extremes of temperature and moisture. One application where optical connectors are used in a harsh environment is in the broadcast industry, where cameras or sound equipment are joined to other electronic equipment by means of fibre optic cables extending across open spaces. The cables may be joined together with optical connectors that may have to lie on the open ground where dirt or mud may find their way into the connector.

One known way to increase the reliability of an optical connector is to make use of an expanded collimated optical beam which is projected between mating connector portions. Then, if dirt or moisture comes between the connector portions, this may only obscure or degrade a portion of the expanded beam between the mated connector portions. The expanded size of the expanded beam relative to the dimensions of the connector portions also reduces the need for high mechanical precision in the connector portions.

An example of such an expanded beam optical connector is disclosed in patent document WO 2007/119036. This document discloses an optical connector in which an optical fibre is held within a ferrule and the stub and ferrule sub-assembly is then secured in place with respect to a ball lens solely by means of an adhesive that partially fills a void within a connector housing. The adhesive, which also holds the lens in place is introduced into the void and cured following an alignment process in which the ferrule and stub sub-assembly is dynamically aligned with respect to the ball lens until the correct optical coupling has been achieved.

Such a connector can be used with optical fibre cables having a plurality of individual optical fibres, each of which leads to a corresponding lens within the connector and a corresponding expanded collimated beam between the connector portions.

Although such a connector is robust and economical, it takes considerable time and expense in manufacture to align the lens with respect to the ferrule and stub sub-assembly. This is owing mainly to the high cost of micromanipulators capable of moving the sub-assembly along three orthogonal axes as well as rotation about one or two axes, and also by the necessity to hold the alignment in place until the adhesive has properly cured.

It is an object of the present invention to provide a more convenient expanded beam optical connector.

SUMMARY OF THE INVENTION

According to the invention, there is provided an expanded beam optical fibre connector for joining optical fibre cables, comprising:
 a housing;
 a port within the housing for receiving an end of an optical fibre;
 a cylindrical ferrule within the housing having opposite first and second ends, an optical fibre stub held axially within the ferrule and extending between said ferrule ends;
 an optical system for projecting and/or receiving an expanded beam, said system comprising at least one lens arranged to optically couple said expanded beam with the optical fibre stub at the first ferrule end;
 a sleeve within the housing, a first portion of said sleeve gripping the ferrule and a second portion of said sleeve extending towards the port axially away from the second ferrule end and having an open end for receiving within said second portion a termination ferrule of an optical fibre inserted into the port; and
 a connector portion for connecting the optical fibre connector to another expanded beam optical fibre connector so that said expanded beam traverses between said connectors;
 wherein a channel extends through the housing from the port towards the optical system, the ferrule being secured by means of a ring within the channel, said ring having an outer surface and an inner surface, said outer surface of the ring making an interference fit with an inner surface of the channel and said inner surface of the ring making an interference fit with an outer surface of the ferrule towards the first ferrule end.

An interference fit, also known as a press fit, is a fastening between two parts which is achieved by friction after the parts are pushed together, rather than by any other means of fastening. Preferably, both the ring and channel are made from metal, while the ferrule will preferably be formed from a ceramic material. For metal parts in particular, the friction that holds the parts together is often greatly increased by compression of one part against the other, which relies on the tensile and compressive strengths of the materials the parts are made from.

A particular advantage of this arrangement is that it is possible to eliminate costly and time-consuming alignment stages, as the alignment is set by the inner and outer dimensions of the ring relative to, respectively the outer dimensions of the ferrule and the inner dimensions of the channel.

In a preferred embodiment of the invention, the outer surface of the ring is a cylindrical surface that makes the interference fit with an inner surface of the channel. The inner surface of the channel with which the interference fit is made is preferably a cylindrical surface.

Also in a preferred embodiment of the invention, the inner surface of the ring is a cylindrical surface that makes the interference fit with an outer surface of the ferrule towards the first ferrule end. The outer surface of the ferrule with which the interference fit is made is preferably a cylindrical surface.

The optical system may comprise a ball lens that makes a transition fit with said inner surface of the channel. A transition fit is defined as one having limits of size so prescribed that either a clearance fit or an interference fit may result when mating parts are assembled. Preferably, the transition fit is an interference fit. This avoids the need for the lens to be secured in place using additional means, such as an adhesive ring to fill any gaps between the lens and channel, although an adhesive may still be used with an interference fit in order to provide an environmental seal and so prevent ingress of moisture or contaminants through any small gaps between the lens and channel.

Because the alignment is determined by press-fitting of components together, the accuracy of the optical alignment between the ferrule and stub sub-assembly and the optical system will depend on the accuracy of the dimensions achieved during the formation of components, particularly the diameters of cylindrical surfaces of the ring and channel. For this reason, it is particularly advantageous if the surfaces of the channel with which the fits are made with the ring and the ball lens are provided by a common cylindrical surface, rather than, for example separate cylindrical surfaces having different internal diameters.

The ferrule and ring are may be secured together by a bead of cured adhesive between a radially extending surface of the ring and said outer surface of the ferrule.

The housing may be a one-piece housing, or may be formed from more than one piece or component, for example a main component and also one or more subsidiary components within the main component, the ring and optical system both being secured by press-fitting within the main component or, alternatively within one or more of the subsidiary components.

The expanded beam will also usually be a collimated beam.

In a preferred embodiment of the invention, the optical system comprises just one lens, a glass ball lens, however other types of optical system may be used, for example an aspheric lens, or a multi-lens system. Optical surfaces may be angled with respect to each other, or anti-reflection coated, in order to suppress back-reflections.

In a preferred embodiment of the invention, the ferrule is secured by means of a cured adhesive that extends between the ferrule and the optical system, in particular, said at least one lens. The adhesive is then preferably index matched and in contact with both the optical fibre stub and a surface of the optical system facing the fibre stub. In this way, back-reflections between the optical fibre stub and optical system can be minimised.

The cured adhesive may advantageously also extend over the first end of the ferrule, in order to make the alignment more secure.

To aid repair or refitting of an optical fibre to the expanded beam connector, the connector assembly may comprise additionally a retainer that surrounds the optical fibre and which is removably joined to the housing to close the port. The retainer is preferably a one-piece annular retainer, and may be joined by a threaded coupling.

The termination ferrule may comprise additionally a collar and a spring biasing means between the collar and the retainer to bias the termination ferrule into the open end of the sleeve. In a preferred embodiment of the invention, the collar has an outer diameter larger than the inner diameter of the retainer. The collar is part of the termination ferrule assembly, and therefore also serves to keep the retainer from coming off the cable at the termination end.

The invention further provides a method of fabricating an expanded beam optical connector for joining optical fibres, comprising the steps of:
  securing an optical fibre stub within a cylindrical ferrule, said ferrule having opposite first and second ends;
  press-fitting a ring over a first end of the ferrule such that an inner surface of the ring makes an interference fit with an outer surface of the ferrule;
  forming a substantially hollow housing having a channel extending therethrough;
  press-fitting the ring into the channel such that an outer surface of the ring makes an interference fit with an inner surface of the channel;
  either before or after the press-fitting of the ring into the channel, placing a sleeve over at least part of the ferrule so that the sleeve extends away from the second ferrule end to present an open end to the sleeve for receiving a termination ferrule of an optical fibre inserted into the port; and
  placing an optical system comprising at least one lens at one end of the channel so that the optical fibre stub and optical system are optically coupled for the transmission (or reception) of an expanded beam from (or by) the optical system.

The optical system may comprise a ball lens that abuts an end of the optical fibre stub. The method may comprise the step of press-fitting the ball lens into the channel until a peripheral surface of the lens makes a transition fit with an inner surface of the channel, and until the ball lens is optically coupled with the optical fibre stub.

Once the expanded beam optical fibre connector has been assembled, an expanded beam optical connector assembly may be assembled by terminating an optical fibre with a termination ferrule that is dimensioned to be securely received within said sleeve, and then inserting the terminated optical fibre into said open end of the sleeve until the termination ferrule is securely received within the sleeve such that the optical fibre is optically coupled with the optical fibre stub.

Prior to press-fitting the ring into the channel, the assembled ring ferrule may optionally be turned in order to machine a cylindrical outer surface of the ring with reference to a central axis of the ferrule.

The open end of the channel may then be closed with the removeably fixable annular retainer.

The assembly of the connector assembly may then include the steps of:
  inserting the annular retainer over the optical fibre;
  fixing a collar to the optical fibre;
  placing a spring biasing means between the collar and the retainer; and
  fixing the retainer to the housing such that the spring biasing means helps to retain the termination ferrule in the sleeve.

The connector assembly may then be finished in a conventional manner by fixing an external connector body and water-tight seals about one or more of the connector assemblies, including a bushing or tail where a multi-fibre optical cable enters the external connector body.

BRIEF DESCRIPTION OF THE DRAWINGS

The invention will now be further described, by way of example only, and with reference to the accompanying drawings, in which:

FIG. 1 is perspective view of an expanded beam connector assembly showing a generally cylindrical connector body portion or shell with a hermaphroditic connection mechanism that surrounds a central fibre optic housing that holds at least one expanded beam optical connector according to a first preferred embodiment of the invention;

FIG. 2 is a view of two of the expanded beam connector assemblies of FIG. 1 when joined together;

FIG. 3 is a front end view of the central fibre optic housing of FIG. 1;

FIG. 4 is a fragmentary cross-section through line IV-IV of FIG. 3, showing internal components that form an expanded beam optical connector according to the first preferred embodiment of the invention, in which a channel extends through the housing from a connection port towards a ball lens and with a ferrule alignment assembly being secured by means of a ring within the channel;

FIG. 5 is a rear end view of the central fibre optic housing of FIG. 1;

DETAILED DESCRIPTION

Figure 6:
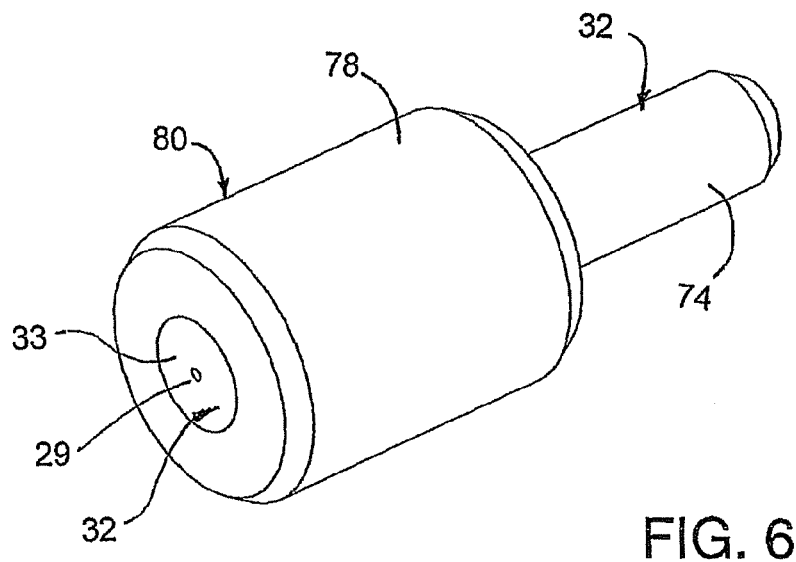
FIG. 6 is an isometric view of the ring of FIG. 4, showing how this holds the ferrule which in turn holds a fibre stub.

FIG. 1 shows a perspective view of an expanded beam connector assembly 1 having a generally cylindrical connector body portion or shell 2 with a hermaphroditic connection mechanism 4, 5 that surrounds a central fibre optic housing 6. The housing 6, which is formed in metal, holds four lenses 8, which here are spherical lenses, for four corresponding optical communication channels. The connector shell 2 defines a connector axis 10 which is in-line with a multi-fibre optic cable 12 that is terminated by the connector assembly 1, and parallel with an expanded beam connector axis 14, as shown in FIG. 4. The axis 14 is perpendicular to a front face 7 of the housing 6.

It should be noted however, that the number of lenses 8 and hence the number of communication channels is not critical to the invention, and that the connector assembly 1 may have any convenient number of lenses 8, for example between one and twelve lenses.

FIG. 2 shows how two such connector assemblies 1, 1' may be joined together. As will be explained in detail below, a spherical lens 8 in each connector assembly is optically coupled to an optical channel through the housing 6 provided by an optical fibre, and projects and/or receives an expanded collimated optical beam from an opposed similar lens in the other connector assembly 1'.

The two connector assemblies 1, 1' have a hermaphroditic coupling mechanism, comprising in each connector a pin 4 and a matching recess 5 which seat and lock with a similar pin and recess on the other connector assembly when the two connector assemblies are brought together along an axial direction.

Although not illustrated, each connector assembly 1, 1' may be provided with a retained plastic moulded dust cap to cover and protect the fibre optic housing 6 within the connector body 2 when the connector assembly is not joined to another similar connector assembly.

In general, as shown in FIG. 1, the connector assembly 1 may utilize more than one expanded collimated beam and so there may be more than one spherical lens 8 and more than one corresponding optical channel through the housing 6. The spherical lenses 8 and optical channels will not, in general, have optical axes 14 which are coincident with the connector assembly axis 10 of the cylindrical housing 6, but will be positioned off-axis and usually parallel with the connector assembly axis 10 so that the expanded beams come into alignment as the two mated connector assemblies 1, 1' are locked together.

An advantage of this type of hermaphroditic design is that there can be no confusion in the field with male or female types and there is no requirement for adaptors. The connector assembly 1 may, however be used also with panel-mount bulkhead connector shells. An outermost rubber grip ring sleeve 16 and flexible strain relief boot 18 are also provided.

FIG. 4 is a cross-section through a part of the housing 6, showing a first embodiment of one expanded beam optical connector 20. For clarity in FIG. 4 and subsequent drawings, just one of the spherical lenses 8 is illustrated together with the components that make up the optical channel leading to the lens 8. As can be seen from FIGS. 1, 3 and 5, there are four such optical connectors 20 in the optical connector assembly 1, each of which shares a common housing 6.

A water tight seal is made between the mated connector assembly shell 2 and the housing 6 by use of internal O-rings 22 which are seated in grooves 23 that extend around the full circumference of the housing 6.

The housing 6 has a stepped generally cylindrical bore 24 having front, central and rear cylindrical portions 25, 26, 27 which are concentric with one another about the connector axis 14. The stepped cylindrical portions 25, 26, 27 define a channel 28 through the housing 6. The spherical lens 8 fits within the front cylindrical portion 25 at a front end 47 of the channel 28.

During assembly of the connector assembly 1, the lens 8 is bonded to surfaces of the front cylindrical portion 25 by means of an adhesive 31 that is used to seal around the external periphery of the lens 8, between the lens and the housing 6.

Figure 7:
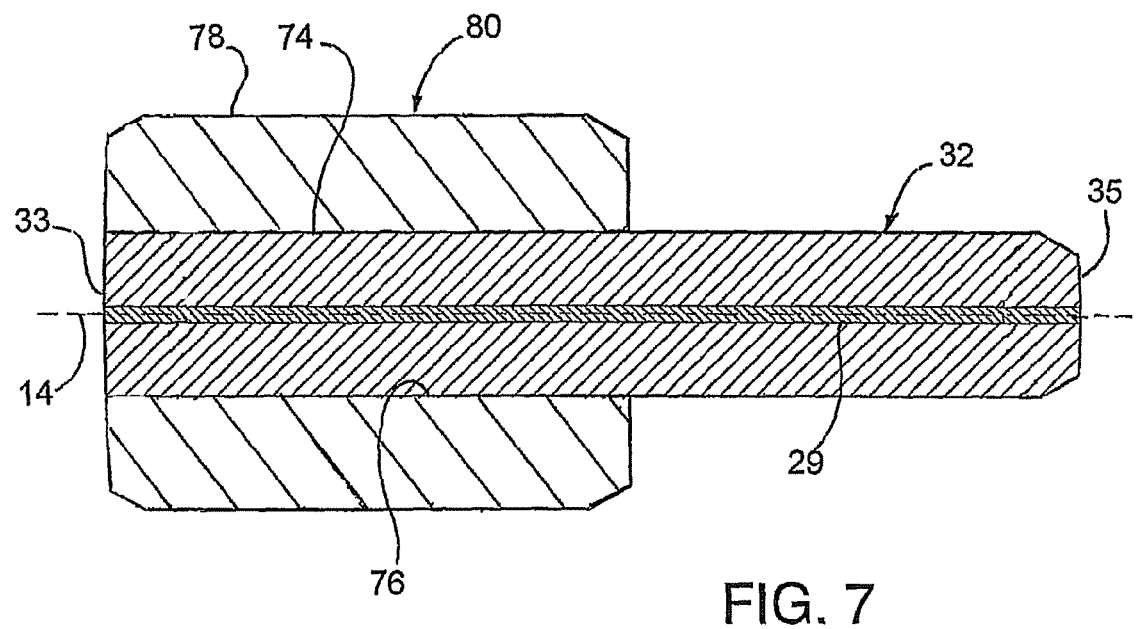
FIG. 7 is an axial cross-section through the assembly of FIG. 6.

With reference now also to FIGS. 6 and 7, a fibre stub 29 is bonded within a bore that extends along the central axis of a zirconia ceramic ferrule 32 to form a ferrule and fibre stub sub-assembly. This subassembly has an end face 33 that abuts or nearly contacts the lens 8.

The ferrule is held within a metal cylindrical ring 80 which is itself held within the front cylindrical portion 25 of the channel 28.

Although the position of the ferrule is secured by the fit between the ferrule and the ring, and by the fit between the ring and the channel, a uv-cured adhesive 30 may be used to bond the lens 8 to a cylindrical ferrule 32 and to provide an index-matched interface between the fibre stub 29 and the lens 8.

A zirconia ceramic split sleeve 34 is engaged around the half of the ferrule 32 furthest from the lens 8 to form a ferrule alignment assembly for connection to another ferrule 36. The sleeve 34 may therefore be secured axially with respect to the ferrule 32 by means of a friction fit.

In FIG. 4 the split sleeve 34 is shown partially cut away so that a ferrule end face 35 furthest from the lens 8 can be seen in abutting contact with a similar ferrule 36, referred to herein as a "termination ferrule" held securely within the split sleeve 34 where this projects in an axial direction from the ferrule 32. The termination ferrule 36 terminates an optical fibre (not shown) within protective sheathing 38 that has been inserted into the channel 28. This split sleeve and ferrule arrangement naturally aligns the optical fibre within the buffered fibre 38 and the fibre stub 29 within the ferrule 32. The optical coupling between these fibres and between the lens 8 and optical fibre 29 within the ferrule 32 is such that the lens 8 is arranged to receive and focus an expanded collimated optical beam 40 onto the end of the optical fibre within the ferrule 32, and also to receive optical radiation received from the optical fibre cable 38 as this is projected from the end of the optical fibre within the ferrule 32 and to collimate this into a similar expanded collimated optical beam 40.

The buffered fibre 38 is terminated by the termination ferrule 36 behind which is a collar 42 having an annular shoulder 44 directed towards the opposite end 46 of the channel 28 from the lens 8, referred to herein as a "port end" 46 of the channel 28. The port end 46 of the channel 28 is closed by means of an annular retainer 48 which is threaded into the port end 46 of the channel 28. The buffered fibre 38 passes through the centre of the retainer 48. A helical spring 50 is held between an inner surface 52 of the retainer 48 and the shoulder 44 of the collar 42. The spring 50 is in compression when the retainer 48 may optionally be threaded to the housing 6, which causes the spring 50 to apply a force that keeps the termination ferrule 36 fully engaged within the split sleeve 34. Other means of holding the retainer to the housing may be employed, for example a separate rear cover (not shown) which is fixed to the housing. Either of these approaches will serve to keep the optical fibre within the buffering 38 fully engaged with the fibre stub 29 within the ferrule 32.

The retainer 48 is provided with an external slot 54 with which a tool (not shown) may be engaged to connect and disconnect the retainer 48 to the housing 6.

The assembly of the ball lens 8, ferrule 32, fibre stub 29, split sleeve 34 and ring 80 will now be described. Before assembly of any other components, the fibre stub 29 is first inserted into ferrule and bonded in place using an adhesive (not shown) which is then cured to form a ferrule and fibre stub sub-assembly. The ends of this sub-assembly are then polished so that light can be efficiently coupled in and out of the sub-assembly.

The ring 80 has a cylindrical inner bore 76 and the ferrule has a cylindrical outer surface 74 that are sized so that the ferrule can be press-fitted into the bore 76 in an interference fit. The ring 80 is positioned around one end of the ferrule, leaving the other end free, in a later stage of assembly, to receive the split sleeve 34.

Optionally, the assembled ring 80 and fibre stub sub-assembly 29, 32 may be turned in a lathe in order to improve the coaxial tolerance of an outer cylindrical surface 78 of the ring with the outer cylindrical surface 74 of the ferrule. This helps to improve the concentricity of the fibre stub axis 14 with the ring outer surface 81.

The sub-assembly formed by the ring 80, fibre stub 29 and ferrule 32 is then inserted into the front end 47 of the channel 28, and press-fitted into the front cylindrical portion 25 of the channel 28. The ring outer cylindrical surface 78 is sized so that the ring makes an interference fit with the front cylindrical portion 25 of the channel 28.

Alternatively, because the middle and rear portions 26, 27 of the channel 28 have a greater diameter than the front portion 25, the sub-assembly formed by the ring 80, fibre stub 29 and ferrule 32 may be inserted into the channel from the rear end 46 of the channel 28.

The ring is pressed into position until this is spaced from the front end 47 of the channel 28 with sufficient space within for the ball lens 8 to be received within the channel front cylindrical portion 25. The ball lens is sized so that this makes a transition fit with the front cylindrical portion 25 as the lens is pressed into the channel 28 until this makes abutting contact with the front end 33 of the ferrule and fibre stub sub-assembly. Prior to this a small amount of optically clear uv-curable adhesive 30 may be placed on the exposed front end 33 of the ferrule 32 and fibre stub 29. After the lens is in place, a ring of adhesive 31 is provided around the periphery of the ball lens where this comes into contact with the channel 28.

Finally, the split sleeve 34 is placed over the free end of the ferrule 32, and may optionally be bonded in place with adhesive (not shown). In this example, the sleeve is a split sleeve having a C-shape in cross-section. The sleeve may, however, have any suitable shape or be formed in any resilient material that will apply an inward compressive force on both ferrules 32, 36.

It has been found in practice that it is possible using this arrangement and process to achieve, correct alignment between the lens 8 and fibre stub 29 without the need to test the alignment or make any adjustments to components (for example, the position of the lens), both for multimode fibre having a core diameter of 50 µm to 62.5 µm and for single mode fibre having a core diameter of 9 µm. To ensure repeatable performance, the ring 80 is machined to have an outer diameter of 2.993 with a tolerance of +0.0005 mm and −0 mm and with an eccentricity of ±0.0005 mm. The front portion 25 of the channel 28 is also machined to a high accuracy, having a nominal diameter of 3.0000±0.0005 mm and with eccentricity of ±0.0005 mm.

The inner bore 76 of the ring 80 has an inner diameter of 1.2495 with a tolerance of +0 mm and −0.0005 mm. The ceramic ferrule is also polished to a high accuracy having a nominal diameter of 1.2495±0.0005 mm and with eccentricity of ±0.0005 mm.

The concentricity between the inner and outer diameters of the ring 80 is 0.0005 mm.

The ring 80 has a length in the axial direction of 4.00±0.05 mm, which provides sufficient degree of grip between the ring 80 and the ferrule 32 and between the ring 80 and channel front portion 25.

The ferrule 32 may be a conventional ceramic optical ferrule, for example being 1.25 mm or 2.50 mm in diameter. Such ferrules 32, are readily available and inexpensive. Because the ring 80 extends fully around and over the front end 33 of the ferrule 32 closest the lens 8, contamination will not enter the interface between the optical fibre stub 29 and the lens 8.

Although the optical system described above comprises just one spherical lens 8 the invention is also applicable to other optical systems having multiple optical elements or aspherical optical elements. The optical fibre stub 29 may be in contact with the spherical lens 8 or other optical elements, or may be separated by a distance necessary to achieve good optical coupling between the optical system and the fibre stub 29 within the ferrule 32.

The optical system may be made to include optical isolating elements to minimise reflections or the fibre stub 29 itself may be an optical isolator.

If it becomes necessary to replace or repair the buffered fibre 38, then this can be done by removing the retainer 48 and inserting a different terminated buffered fibre 38 into the channel 28 and sleeve 34 as described above, after which the channel 28 is again closed by the retainer 48.

When the connector assembly 1 has multiple expanded beam optical connectors 20, then each buffered fibre 38 will normally be part of a single multi-optical fibre cable 12 carrying multiple optical fibre strands.

The invention provides a number of benefits in terms of manufacturing efficiency and cost. Most parts of the housing 6 do not need to be machined to high accuracy. Only the lens aperture at the front cylindrical portion 25 needs to be dimensioned accurately to fit an optical component such as the ball lens 8 and ring assembly 80, 32, 29. Because there is no need to optically align components during assembly, cost is saved both in terms of the equipment needed and in terms of the number of units that can be assembled in a given time on a particular production line.

This success of this method relies on the concentricity of the sleeve and the ferrule. To further improve the concentricity, after ferrule is pushed into the ring, the assembled ring and ferrule may be rotated concentric with the bore and the outer diameter of the sleeve then machined, for example by grinding, to make this more concentric with the ferrule bore. This improves the concentricity of the ring and ferrule sub-assembly by negating any eccentricity build-up between these two parts.

The interference fits are inherently stable which provides good stability over a wide range of temperatures and humidities. Environmental performance is enhanced by bonding around the lens with an adhesive 31.

The expanded beam optical fibre connector described above therefore provides a convenient and economical expanded beam optical connector assembly.

It is to be recognized that various alterations, modifications, and/or additions may be introduced into the method or the constructions and arrangements of parts described above without departing from the spirit or scope of the present invention, as defined by the appended claims.

The invention claimed is:

1. An expanded beam optical fibre connector for joining optical fibre cables, comprising:
    a housing;
    a port within the housing for receiving an end of an optical fibre;
    a cylindrical ferrule within the housing having opposite first and second ends, an optical fibre stub held axially within the ferrule and extending between said ferrule ends;
    an optical system for projecting and/or receiving an expanded beam, said system comprising at least one optical element arranged to optically couple said expanded beam with the optical fibre stub at the first ferrule end;
    a sleeve within the housing, a first portion of said sleeve receiving the ferrule and a second portion of said sleeve extending towards the port axially away from the second ferrule end and having an open end for receiving within said second portion a termination ferrule of an optical fibre inserted into the port; and
    a connector portion for connecting the optical fibre connector to another expanded beam optical fibre connector so that said expanded beam traverses between said connectors;
    wherein a channel extends through the housing from the port towards the optical system, the ferrule being secured by a ring within the channel, said ring having an outer surface and an inner surface, said outer surface of the ring making an interference fit with an inner surface of the channel and said inner surface of the ring making an interference fit with an outer surface of the ferrule towards the first ferrule end.

2. An expanded beam optical fibre connector as claimed in claim 1, in which the outer surface of the ring is a cylindrical surface that makes said interference fit with an inner surface of the channel.

3. An expanded beam optical fibre connector as claimed in claim 2, in which the inner surface of the channel with which the interference fit is made is a cylindrical surface.

4. An expanded beam optical fibre connector as claimed in claim 1, in which the inner surface of the ring is a cylindrical surface that makes said interference fit with an outer surface of the ferrule towards the first ferrule end.

5. An expanded beam optical fibre connector as claimed in claim 4, in which the outer surface of the ferrule with which the interference fit is made is a cylindrical surface.

6. An expanded beam optical fibre connector as claimed in claim 1, in which the optical element comprises a ball lens that makes a transition fit with said inner surface of the channel.

7. An expanded beam optical fibre connector as claimed in claim 6, in which said inner surfaces of the channel with which said fits are made with the ring and the ball lens are provided by a common cylindrical surface.

8. An expanded beam optical fibre connector as claimed in claim 1, in which the ferrule and ring are secured together by a bead of cured adhesive between a radially extending surface of the ring and said outer surface of the ferrule.

9. An expanded beam optical fibre connector as in claim 1 wherein the ring is located toward the first ferrule end.

10. An expanded beam optical fibre connector as in claim 1 wherein the outer surface of the ring is machined.

11. An expanded beam optical fibre connector as in claim 1 wherein the optical element makes a transition fit with the inner surface of the channel.

12. An expanded beam optical fibre connector as in claim 1 wherein an adhesive is located around the periphery of the optical element and the adhesive engages the channel.

13. An expanded beam optical fibre connector as in claim 1 wherein an adhesive is located between the optical element and the ferrule.

14. An expanded beam optical fibre connector as in claim 1 wherein the optical element is a lens.

15. An expanded beam optical fibre connector as in claim 14 wherein the lens is a ball lens.

16. An expanded beam optical fibre connector as in claim 1 wherein the sleeve is a split sleeve.

17. An expanded beam optical fibre connector as in claim 1 wherein the sleeve is C-shape in cross-section.

18. An expanded beam optical fibre connector as in claim 1 wherein the sleeve applies a compressive force on the ferrule.

19. An expanded beam optical fibre connector as in claim 1 wherein the sleeve is attached to the ferrule with an adhesive.

20. An expanded beam optical fibre connector as in claim 1 wherein the fibre stub contacts the optical element.

21. An expanded beam optical fibre connector as in claim 1 wherein the fibre stub is separated from the optical element.

22. An expanded beam optical fibre connector as in claim 1 wherein the optical element is aspherical.

23. An expanded beam optical fibre connector as in claim 1 wherein the optical system includes an optical isolating element.

* * * * *